United States Patent
Kunisada (10) Patent No.: US 8,753,238 B2
(45) Date of Patent: Jun. 17, 2014

(54) BELT DETACHMENT TOOL

(71) Applicant: Bando Chemical Industries, Ltd., Hyogo (JP)

(72) Inventor: Takashi Kunisada, Hyogo (JP)

(73) Assignee: Bando Chemical Industries, Ltd., Hyogo (JP)

(*) Notice: Subject to any disclaimer, the term of this patent is extended or adjusted under 35 U.S.C. 154(b) by 0 days.

(21) Appl. No.: 14/031,858

(22) Filed: Sep. 19, 2013

(65) Prior Publication Data

US 2014/0018200 A1    Jan. 16, 2014

Related U.S. Application Data (63) Continuation of application No. PCT/JP2012/001609, filed on Mar. 8, 2012.

(30) Foreign Application Priority Data

Mar. 23, 2011    (JP) .................................. 2011-064787

(51) Int. Cl.
F16H 7/22    (2006.01)

(52) U.S. Cl.
USPC .......................................................... 474/130

(58) Field of Classification Search
USPC ........................................ 474/101, 119, 130
See application file for complete search history.

(56) References Cited

U.S. PATENT DOCUMENTS

| | | | |
|---|---|---|---|
| 2,924,109 A * | 2/1960 | Carriveau | 474/130 |
| 3,138,963 A * | 6/1964 | Prince | 474/130 |
| 2002/0103048 A1 | 8/2002 | Amkreutz | |
| 2008/0155803 A1 | 7/2008 | Iwata | |

FOREIGN PATENT DOCUMENTS

| | | |
|---|---|---|
| EP | 1701062 A2 | 9/2006 |
| JP | 2004-533579 A | 11/2004 |
| JP | 2006-064125 A | 3/2006 |
| JP | 2006-250286 A | 9/2006 |
| JP | 2008-164053 A | 7/2008 |
| JP | 2009-115149 A | 5/2009 |

OTHER PUBLICATIONS

International Search Report; PCT/JP2012/001609; May 22, 2012.

* cited by examiner

*Primary Examiner* — William E Dondero
(74) *Attorney, Agent, or Firm* — Studebaker & Brackett PC (57) ABSTRACT

A belt detachment tool 10 includes a detacher 11 and a pulley engagement portion 12. The detacher 11 includes a belt-climbing surface 11a', a belt-sliding surface 11b', and a belt-transferring surface 11c' disposed therebetween. At least a belt contact portion of the belt-transferring surface 11c' has a radius of curvature of 5-11 mm in plan view.

11 Claims, 8 Drawing Sheets

BELT DETACHMENT TOOL

CROSS-REFERENCE TO RELATED APPLICATIONS

This is a continuation of International Application No. PCT/JP2012/001609 filed on Mar. 8, 2012, which claims priority to Japanese Patent Application No. 2011-064787 filed on Mar. 23, 2011. The entire disclosures of these applications are incorporated by reference herein.

BACKGROUND

The present invention relates to belt detachment tools used to detach a power transmission belt wound over pulleys.

Many automobiles and general industrial machinery employ a belt transmission apparatus that includes a power transmission belt wound over pulleys and serves as a power transmitter for transmitting power from a source of motion.

In assembling such a belt transmission apparatus, a power transmission belt that is wound over and attached on pulleys is sometimes temporarily detached from the pulleys, e.g., to adjust the tension. After the adjustment, the power transmission belt is attached to the pulleys again.

Japanese Unexamined Patent Publication (Japanese Translation of PCT Application) No. 2004-533579 describes a belt detachment tool for the above-described case. This belt detachment tool has a curved body including a pulley engagement surface and a belt engagement surface that constitute an edge of the belt detachment tool.

SUMMARY

The present invention relates to a belt detachment tool used to detach, with a pulley rotated, a power transmission belt wound over the pulley.

The belt detachment tool includes a detacher.

The belt detachment tool includes a pulley engagement portion engaging with the pulley so that the detacher protrudes outwardly from a circumferential surface of the pulley.

The detacher with the pulley engagement portion engaging with the pulley includes a belt-climbing surface, a belt-sliding surface, and a belt-transferring surface.

The belt-climbing surface is a front surface having an upward slope from a front side to a rear side with respect to a rotation direction of the pulley from which the belt is detached. The belt-climbing surface that is in contact with an inner circumferential surface of the power transmission belt wound over the pulley guides the power transmission belt climbing up from a side, of the belt-climbing surface, closer to the pulley to a side, of the belt-climbing surface, farther from the pulley when the detacher is wedged between the pulley and the power transmission belt after the pulley is rotated and the detacher is positioned at a beginning from which the power transmission belt is wound over the pulley.

The belt-sliding surface is a side surface having an upward slope from a widthwise side, of the pulley, from which the belt is detached, to a side opposite thereto. The belt-sliding surface that is in contact with the inner circumferential surface of the power transmission belt climbing up the belt-climbing surface guides the power transmission belt out of the pulley sliding down from a side, of the belt-sliding surface, farther from the pulley to a side, of the belt-sliding surface, closer to the pulley.

The belt-transferring surface is an outwardly curved round surface provided between the belt-climbing surface and the belt-sliding surface, and connecting the belt-climbing surface with the belt-sliding surface smoothly. The belt-transferring surface that is in contact with the inner circumferential surface of the power transmission belt climbing up the belt-climbing surface transfers the power transmission belt to the belt-sliding surface.

At least a belt contact portion of the belt-transferring surface has a radius of curvature of 5-11 mm in plan view.

Other and further objects, features and advantages of the invention will appear more fully from the following descriptions.

DETAILED DESCRIPTION

The embodiment will be described in detail with reference to the drawings.

FIGS. 1-7 illustrate a belt detachment tool 10 of this embodiment. The belt detachment tool 10 of this embodiment is a jig for detaching, with a ribbed pulley 20 rotated, a V-ribbed belt B (a power transmission belt) wound over the ribbed pulley 20 of a belt transmission apparatus that drives auxiliary machinery provided in an automobile engine room.

The belt detachment tool 10 of this embodiment is a block-like injection-molded article made of a resin material such as polypropylene resin, polyethylene resin, ABS resin, etc. The dimensions of the belt detachment tool 10 of this embodiment depend on the sizes of the V-ribbed belt B to be detached and the ribbed pulley 20. The maximum outer dimension is, e.g., 20-60 mm.

The belt detachment tool 10 of this embodiment includes a detacher 11 extending from a front surface side to a back surface side of the belt detachment tool 10. The belt detachment tool 10 also includes a pulley engagement portion 12 in a lower portion of the detacher 11.

The detacher 11 includes a front surface 11a that is, in front view, in the form of a right triangle. The right triangle has a short side, a long side, and a hypotenuse. The short side is orthogonal to the long side. The hypotenuse is opposite the right angle. The short side is disposed closer to an undersurface of the detacher 11. The hypotenuse is disposed closer to a first side surface 11b. The long side is disposed closer to a second side surface 11e. The front surface 11a is a smooth surface having an upward slope from the front surface side to the back surface side of the detacher 11. More specifically, the front surface 11a is a smooth tilted surface extending from the front surface side to the back surface side of the detacher 11, and extending from the lower side to the upper side of the detacher 11. The front surface 11a has a tilt angle $\theta_1$ of, e.g., 20-60°, preferably, 30-50°.

The detacher 11 includes the first side surface 11b that is, in side view, in the form of an arc-shaped band. The first side surface 11b serves as the hypotenuse of the front surface 11a, which is in the form of a right triangle. That is, the first side surface 11b is a smooth surface having an upward slope from the first side surface 11b to the second side surface 11e. More specifically, the first side surface 11b is a smooth tilted surface extending from the first side surface to the second side surface, and extending from the lower side to the upper side of the detacher 11. The first side surface 11b has a tilt angle $\theta_2$ of, e.g., 30-70°, preferably 40-60°.

A boundary between the front surface 11a and the first side surface 11b is a round surface 11c. The round surface 11c connects the front surface 11a with the first side surface 11b smoothly, and is curved outwardly. At least a lower part of the round surface 11c has a radius r of curvature of 5-11 mm in plan view. The round surface 11c may have a uniform radius r of curvature from the upper side to the lower side of the detacher 11 in plan view. Alternatively, the round surface 11c may have a non-uniform radius r of curvature from the upper side to the lower side of the detacher 11 in plan view. At least a belt contact portion 13, which is a lower portion of the detacher 11, has a radius r of curvature of 5-11 mm, preferably 8-10 mm, in plan view. In addition, the radius r of curvature is preferably 1.2-2.6 times, preferably 1.9-2.3 times as large as the thickness of the V-ribbed belt B to be detached.

The detacher 11 includes a back surface 11d and the second side surface 11e that are situated along vertical planes. The detacher 11 also includes a cavity 14 that avoids sinking during molding of the belt detachment tool 10. The cavity 14 opens to the back surface 11d and the second side surface 11e. The cavity 14 communicates with the first side surface 11b through a through hole 15 that is provided on a slightly upper portion of the first side surface 11b and closer to the back surface side of the belt detachment tool 10. In addition, the detacher 11 includes a plan surface 11f that forms a slender band extending from the front surface side to the back surface side of the detacher 11 to form an arc of the upper side of the first side surface 11b.

Figure 1:
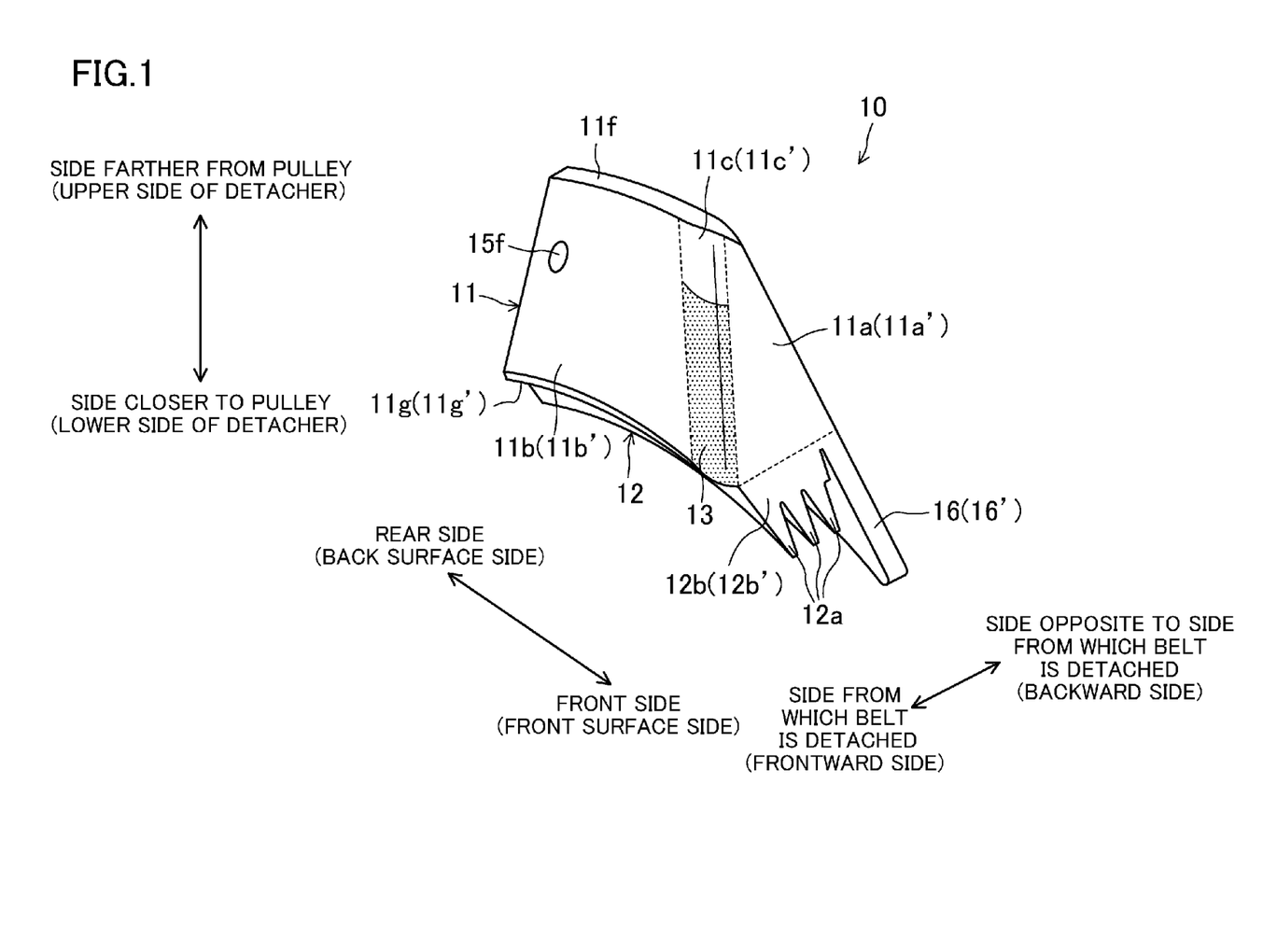
FIG. 1 is a perspective view illustrating a planar surface, a front surface, and one of side surfaces of a belt detachment tool of an embodiment.
Figure 2:
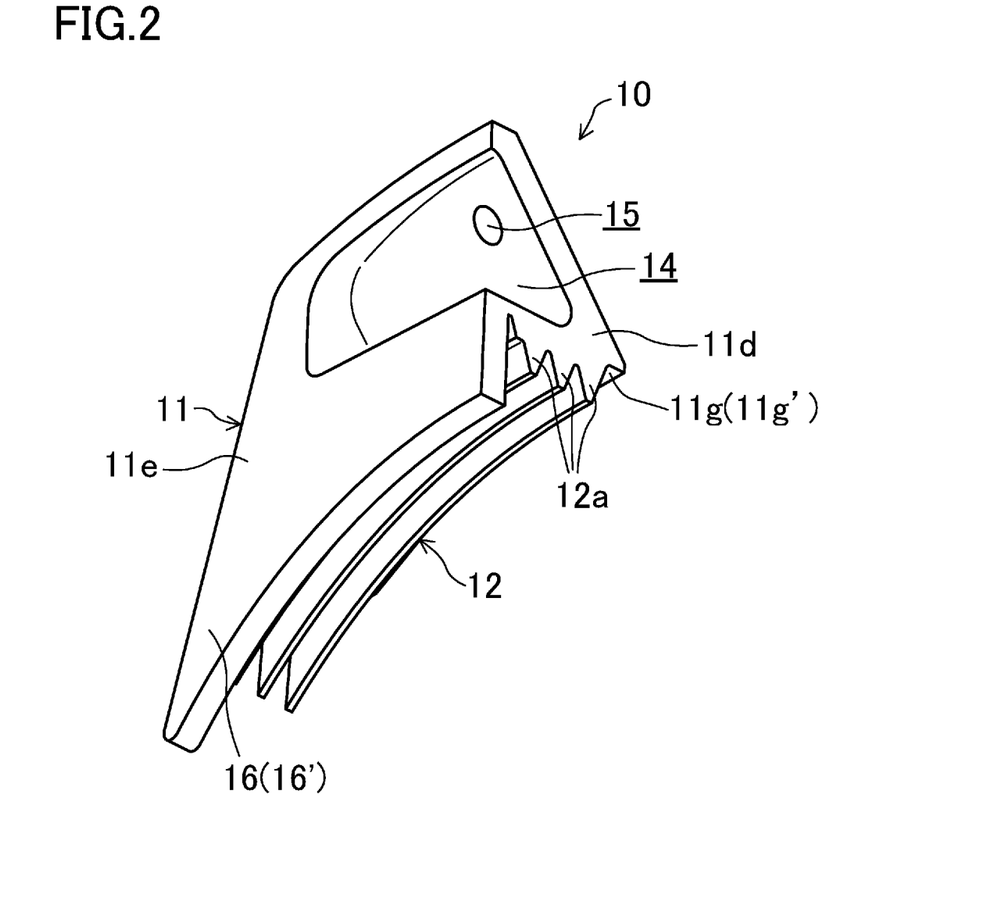
FIG. 2 is a perspective view illustrating an undersurface, a back surface, and the other side surface of the belt detachment tool of the embodiment.
Figure 3:
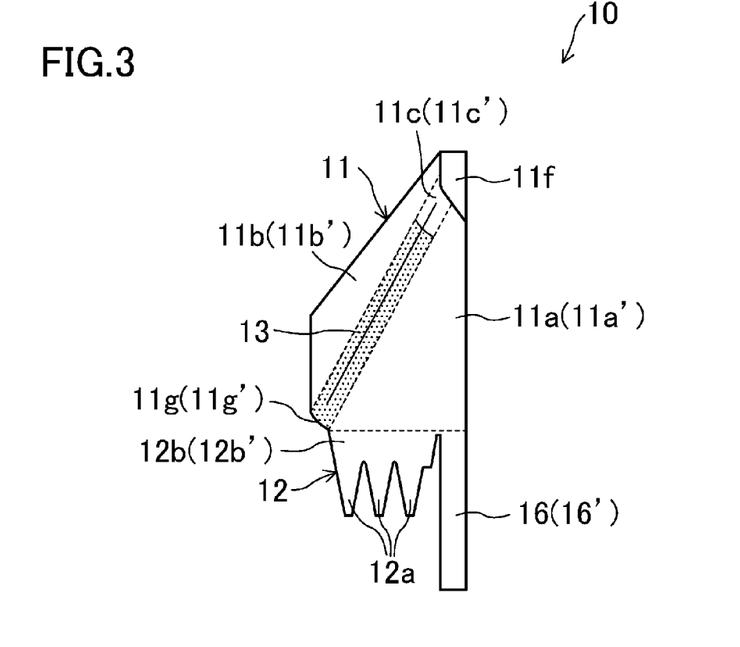
FIG. 3 is a front view of the belt detachment tool of the embodiment.
Figure 4:
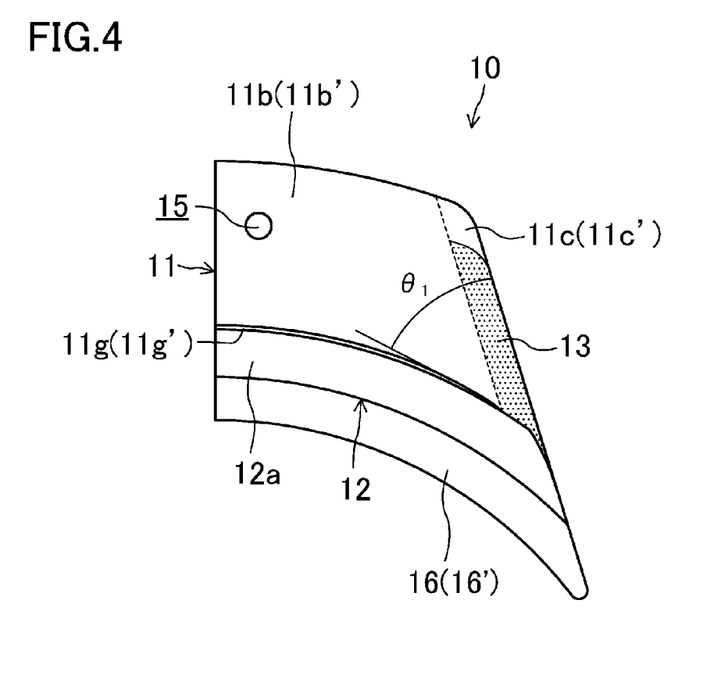
FIG. 4 is one of side views of the belt detachment tool of the embodiment.
Figure 5:
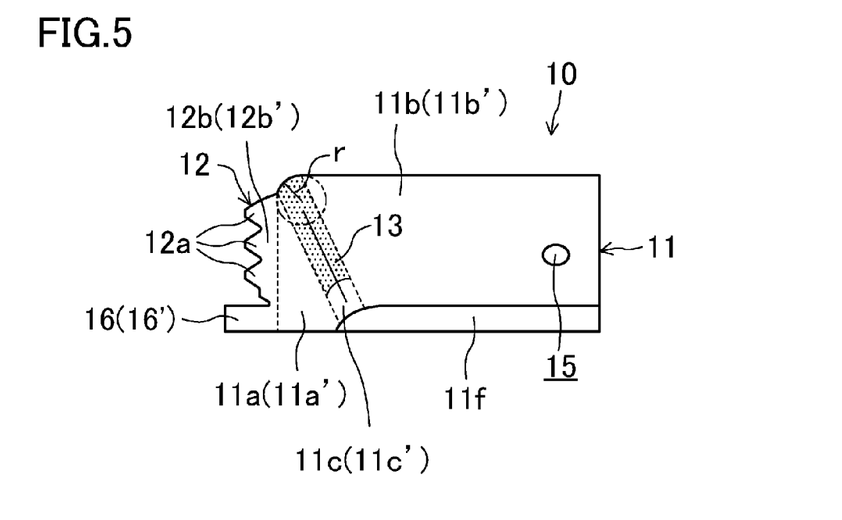
FIG. 5 is a plan view of the belt detachment tool of the embodiment.
Figure 6:
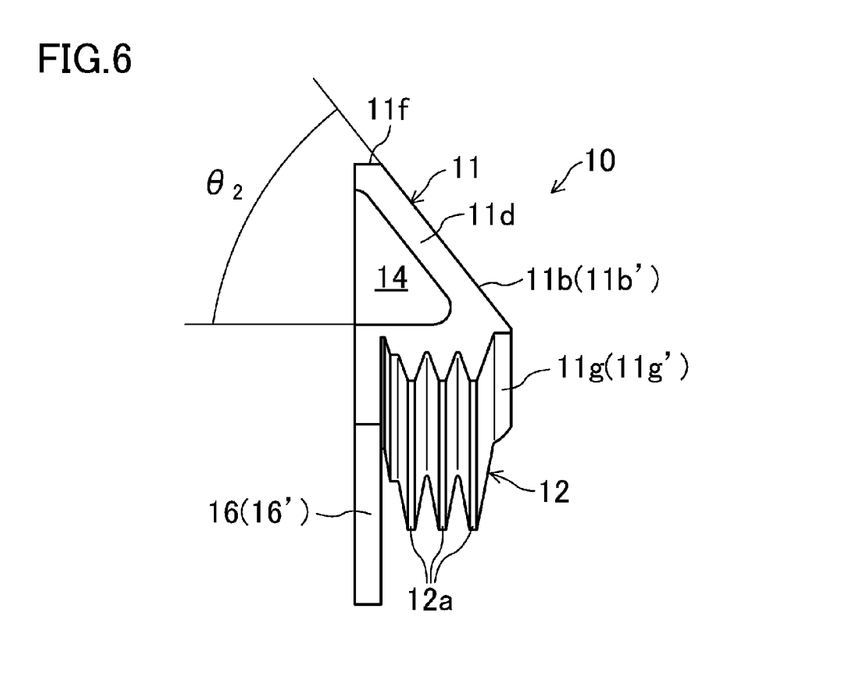
FIG. 6 is a back view of the belt detachment tool of the embodiment.
Figure 7:
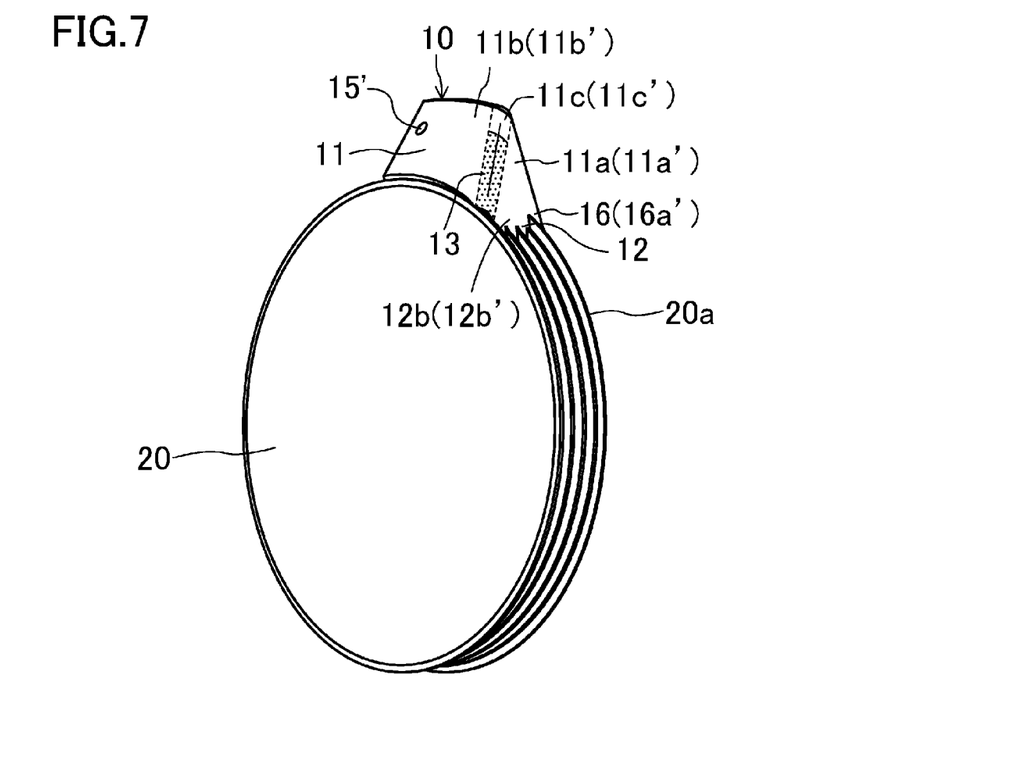
FIG. 7 is a perspective view illustrating that the belt detachment tool of the embodiment is installed on a ribbed pulley.

The pulley engagement portion 12 includes a plurality of ribs 12a extending parallel to one another and downwardly from the undersurface of the detacher 11. As illustrated in FIG. 7, the plurality of ribs 12a, of the pulley engagement portion 12, engaging with grooves of the ribbed pulley 20 allow the belt detachment tool 10 of this embodiment to engage with and be installed on the ribbed pulley 20. In addition, a surface 12b, in the front surface side, of the pulley engagement portion 12 is a tilted surface continuous to the front surface 11a of the detacher 11. Note that the shapes, the dimensions, and the number of the ribs 12a (three ribs in the drawings) depend on the sizes of the V-ribbed belt B to be detached and the ribbed pulley 20.

The belt detachment tool 10 of this embodiment includes a flange-fitting ridge 16. The flange-fitting ridge 16 forms a continuous surface with the second side surface 11e of the detacher 11. The flange-fitting ridge 16 extends downwardly from the second side surface 11e of the detacher 11. The flange-fitting ridge 16 is flat and extends along a lengthwise direction of the belt detachment tool 10. As illustrated in FIG. 7, a flange 20a of the ribbed pulley 20 on which the belt detachment tool 10 of this embodiment is installed fits into a space between the flange-fitting ridge 16 and the rib 12a, closest to the second side surface 11e, of the plurality of ribs 12a constituting the pulley engagement portion 12. That is, the flange-fitting ridge 16 serves as a guide 16' that enables the belt detachment tool 10 of this embodiment to be fitted into and fixed on the ribbed pulley 20.

The detacher 11 of the belt detachment tool 10 of this embodiment includes an undersurface 11g disposed outside the rib 12a, closest to the first side surface 11b, of the plurality of ribs 12a constituting the pulley engagement portion 12. The undersurface 11g is slender and extends along the lengthwise direction of the belt detachment tool 10. As illustrated in FIG. 7, the undersurface 11g of the detacher 11 covers the flange 20a of the ribbed pulley 20 on which the belt detachment tool 10 of this embodiment is installed. That is, the detacher 11 includes the slender undersurface 11g that serves as a flange cover 11g'.

Next, FIGS. 8-12 illustrate a method for detaching a V-ribbed belt B from a second ribbed pulley 22 of a belt transmission apparatus to the frontward side with the belt detachment tool 10 of this embodiment. The V-ribbed belt B is wound over a first ribbed pulley 21 and the second ribbed pulley 22 that are laterally separated from each other in the front side of the belt transmission apparatus. In addition, the diameters of the first and second ribbed pulleys 21 and 22 constituting the belt transmission apparatus are, e.g., 80-160 mm. The V-ribbed belt B has, e.g., a length of 700-3000 mm, a width of 10-36 mm, and a thickness of 4.0-5.0 mm. The heights of the ribs are, e.g., 2.0-3.0 mm. The distance between bases of the ribs is, e.g., 1.0-3.6 mm. The number of the ribs is, e.g., from three to six.

First, the belt detachment tool 10 of this embodiment is installed on an exposed circumferential surface, of the second ribbed pulley 22, that is not covered by the V-ribbed belt B. Specifically, the belt detachment tool 10 of this embodiment is disposed so that the first side surface 11b of the detacher 11 faces toward the frontward side, i.e., a widthwise side, of the pulley 22, from which the belt is detached. Grooves on the circumferential surface of the second ribbed pulley 22 engage with the plurality of ribs 12a constituting the pulley engagement portion 12. Here, the flange 22a is located on the backward side of the second ribbed pulley 22, i.e., the side opposite to the widthwise side, of the pulley 22, from which the belt is detached. This flange 22a fits into a space between the flange-fitting ridge 16 serving as the guide 16' and the rib 12a.

In this situation, the belt detachment tool 10 of this embodiment engages with and is installed on the second ribbed pulley 22. The belt detachment tool 10 of this embodiment is also fitted into and fixed on the second ribbed pulley 22. In addition, the detacher 11 protrudes outwardly from the circumferential surface of the pulley 22. Moreover, the slender undersurface 11g of the detacher 11 covers the flange 22a located on the widthwise side, of the pulley, from which the belt is detached. Furthermore, the surface 12b on the front surface side of the pulley engagement portion 12 forms a smooth, continuous surface with the circumferential surface of the second ribbed pulley 22 and the front surface 11a.

Second, the first ribbed pulley 21 and the second ribbed pulley 22 are rotated, synchronizing with each other through the V-ribbed belt B. Then, the detacher 11 is positioned at the beginning from which the V-ribbed belt B is wound over the second ribbed pulley 22.

Figure 8:
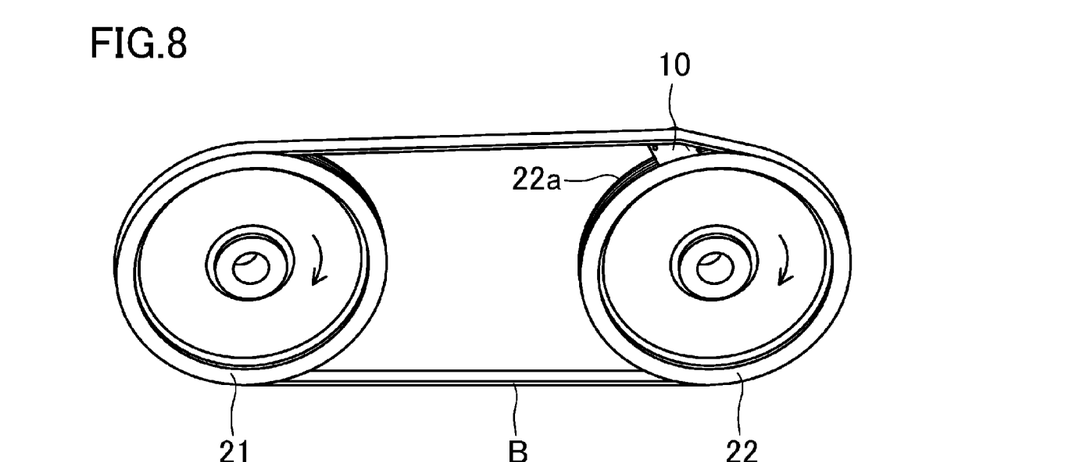
FIG. 8 is a first diagram illustrating a method for detaching a V-ribbed belt with the belt detachment tool of the embodiment.

As illustrated in FIG. 8, when the second ribbed pulley 22 is rotated and the detacher 11 is positioned at the beginning from which the V-ribbed belt B is wound over the second ribbed pulley 22, the detacher 11 is wedged between the second ribbed pulley 22 and the V-ribbed belt B. In this situation, firstly, as indicated by an arrow 1 in FIG. 9, the V-ribbed belt B wound over the second ribbed pulley 22 passes over the surface 12b on the front surface side of the pulley engagement portion 12, and then climbs up the tilted front surface 11a of the detacher 11. During this time, the inner surface of the V-ribbed belt B is in contact with and slides on the surface 12b and the surface 11a. In other words, the front surface 11a of the detacher 11 serves as a belt-climbing surface 11a'. While the pulley engagement portion 12 engages with the second ribbed pulley 22, the belt-climbing surface 11a' has an upward slope from a front side (the front surface side) to a rear side (the back surface side) with respect to a rotation direction of the pulley 22 from which the belt B is detached. More specifically, the belt-climbing surface 11a' is a tilted surface extending from a front side (the front surface side) to a rear side (the back surface side) with respect to a rotation direction of the pulley 22 from which the belt B is detached, and extending from a side closer to the pulley 22, which is a lower side of the detacher 11, to a side farther from the pulley 22, which is an upper side of the detacher 11. The belt-climbing surface 11a' that is in contact with an inner circumferential surface of the V-ribbed belt B wound over the second ribbed pulley 22 guides the V-ribbed belt B from the side closer to the pulley (the lower side of the detacher 11) to the side farther from the pulley 22 (the upper side of the detacher 11). Note that the front surface 11a may be parallel to the pulley width direction. Alternatively, the front surface 11a may be somewhat angled with respect to the pulley width direction so that the front surface 11a faces toward the side from which the belt B is detached. The surface 12b on the front surface side of the pulley engagement portion 12 serves as a belt-introducing surface 12b' tilted and forming a smooth, continuous surface with the circumferential surface of the second ribbed pulley 22 and the front surface 11a serving as the belt-climbing surface 11a'. Note that the plurality of ribs 12a may have their front ends arranged along the pulley width direction. Alternatively, the plurality of ribs 12a may have their front ends arranged along a line angled with respect to the pulley width direction.

Figure 9:
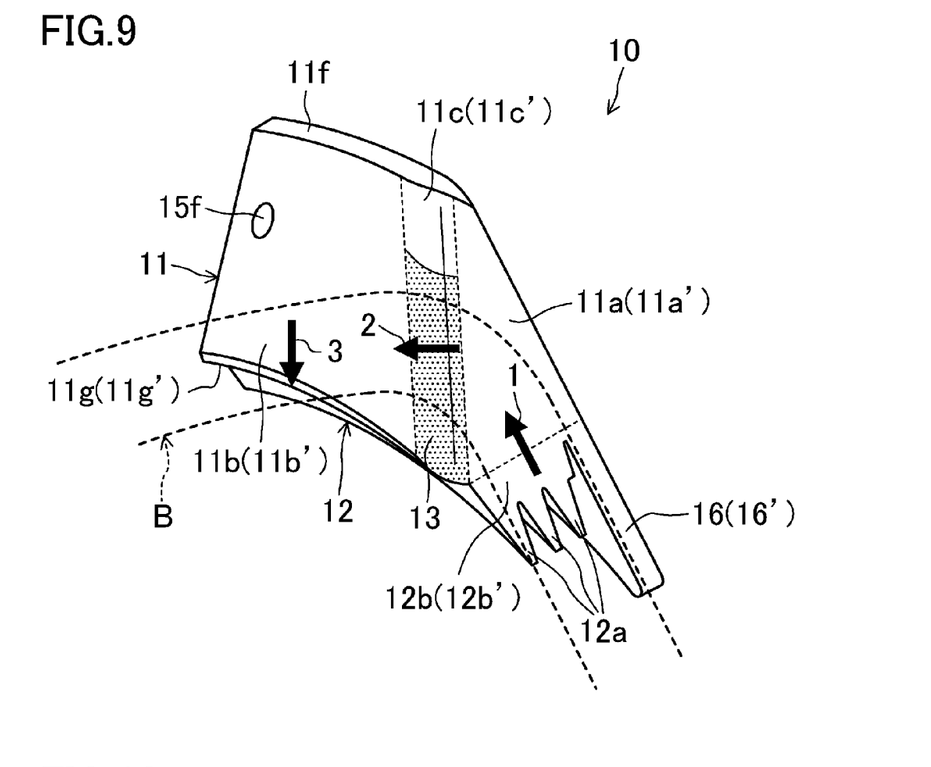
FIG. 9 is a second diagram illustrating the method for detaching the V-ribbed belt with the belt detachment tool of the embodiment.

Secondly, as indicated by an arrow 2 in FIG. 9, after climbing up the front surface 11a, of the detacher 11, serving as the belt-climbing surface 11a', the V-ribbed belt B passes over the round surface 11c which the inner circumferential surface of the V-ribbed belt B is in contact with and slides on. Then, the V-ribbed belt B transfers to the first side surface 11b. In other words, the round surface 11c of the detacher 11 serves as a belt-transferring surface 11c'. While the pulley engagement portion 12 engages with the second ribbed pulley 22, the belt-transferring surface 11c' is provided between the front surface 11a, of the detacher 11, serving as the belt-climbing surface 11a' and the first side surface 11b. The belt-transferring surface 11c' serves as an outwardly curved surface that connects the front surface 11a with the first side surface 11b smoothly. The belt-transferring surface 11c' that is in contact with the inner circumferential surface of the V-ribbed belt B transfers, to the first side surface 11b, the V-ribbed belt B climbing up the front surface 11a, of the detacher 11, serving as the belt-climbing surface 11a'.

Figure 10:
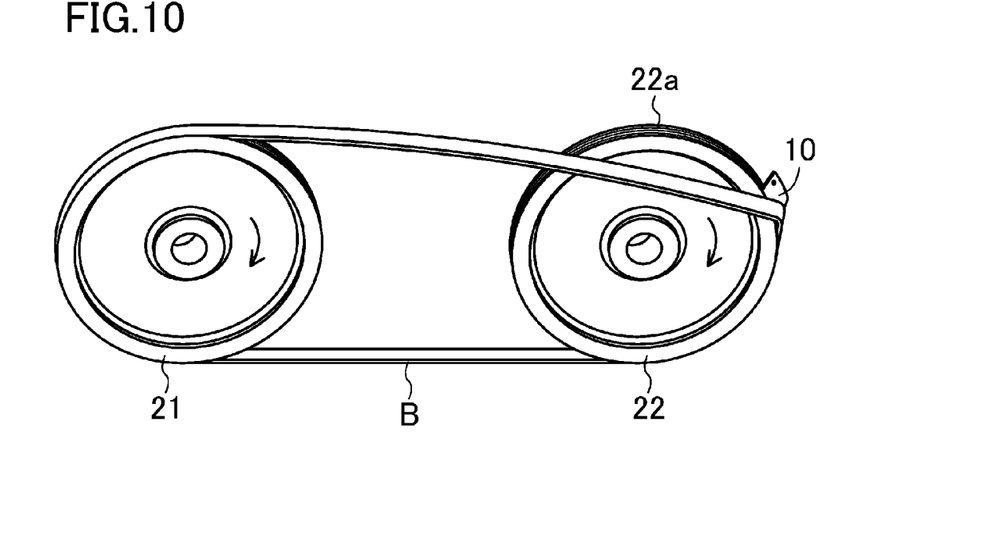
FIG. 10 is a third diagram illustrating the method for detaching the V-ribbed belt with the belt detachment tool of the embodiment.
Figure 11:
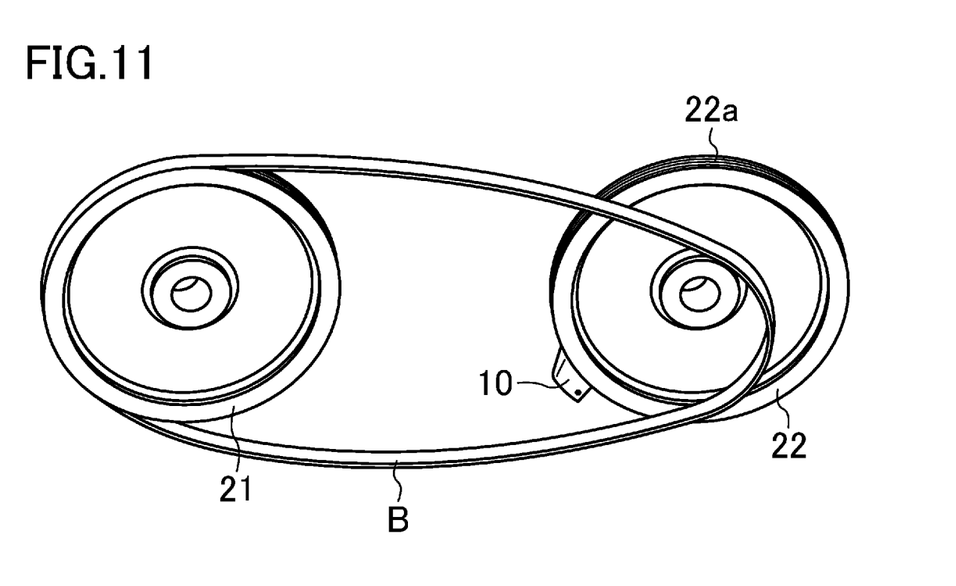
FIG. 11 is a fourth diagram illustrating the method for detaching the V-ribbed belt with the belt detachment tool of the embodiment.

Thirdly, as indicated by an arrow 3 in FIG. 9, after climbing up the front surface 11a, of the detacher 11, which serves as the belt-climbing surface 11a', and passing over the round surface 11c, which serves as the belt-transferring surface 11c', the V-ribbed belt B of which the inner circumferential surface is in contact with and slides on the first side surface 11b slides down out of the first side surface 11b. Then, as illustrated in FIG. 10, the V-ribbed belt B is guided to the outside of the second ribbed pulley 22. Finally, as illustrated in FIG. 11, the V-ribbed belt B is detached from the second ribbed pulley 22. In other words, the first side surface 11b of the detacher 11 serves as a belt-sliding surface 11b'. While the pulley engagement portion 12 engages with the second ribbed pulley 22, the belt-sliding surface 11b' has an upward slope from a widthwise side (the frontward side), of the pulley 22, from which the belt B is detached, to a side (the backward side) opposite thereto. More specifically, the belt-sliding surface 11b' is a tilted surface extending from a widthwise side (the frontward side), of the pulley 22, from which the belt B is detached, to a side (the backward side) opposite to the widthwise side, of the pulley 22, from which the belt B is detached, and extending from a side, of the belt-sliding surface 11b', closer from the pulley 22, to a side, of the belt-sliding surface 11b', farther to the pulley 22. The belt-sliding surface 11b' is in contact with the inner circumferential surface of the V-ribbed belt B that is transferred to the belt-sliding surface 11b' after climbing up the front surface 11a, of the detacher 11, which serves as the belt-climbing surface 11a', and passing over the round surface 11c, which serves as the belt-transferring surface 11c'. Then, the belt-sliding surface 11b' guides the V-ribbed belt B from the side farther from the second ribbed pulley 22 to the side closer to the second ribbed pulley 22 so that the V-ribbed belt B slides down out of the second ribbed pulley 22.

The belt detachment tool 10 of this embodiment can reduce damage, to the V-ribbed belt B, such as cracking or fraying that occurs when the V-ribbed belt B wound over the first and second ribbed pulleys 21 and 22 is detached therefrom because at least the belt contact portion 13 of the round surface 11c serving as the belt-transferring surface 11c' has, in plan view, a radius r of curvature of 5-11 mm. In general, a power transmission belt once detached from a pulley cannot be returned to the pulley if the power transmission belt is damaged when detached from the pulley. However, the belt detachment tool 10 of this embodiment can reduce damage, to the V-ribbed belt B, such as cracking or fraying, and thus the V-ribbed belt B can be attached to the pulleys 21 and 22 again.

In addition, the flange-fitting ridge 16 serving as the guide 16' is provided on the side opposite to the widthwise side, of the pulley 22, from which the belt is detached. Thus, this configuration can reduce damage, to the V-ribbed belt B, that occurs due to contact with the flange-fitting ridge 16 when the V-ribbed belt B is detached from the second ribbed pulley 22.

Figure 12A:
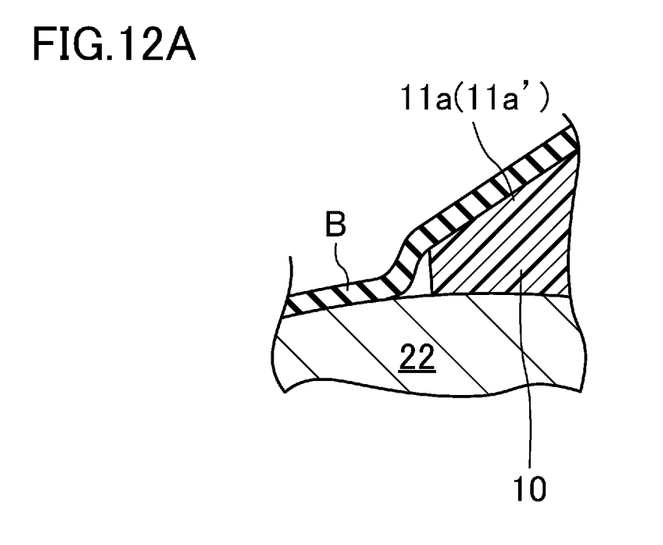
FIG. 12A is a diagram illustrating how the V-ribbed belt climbs up the front surface of the detacher in the presence of a step between a circumferential surface of a pulley and a front surface of the detacher.
Figure 12B:
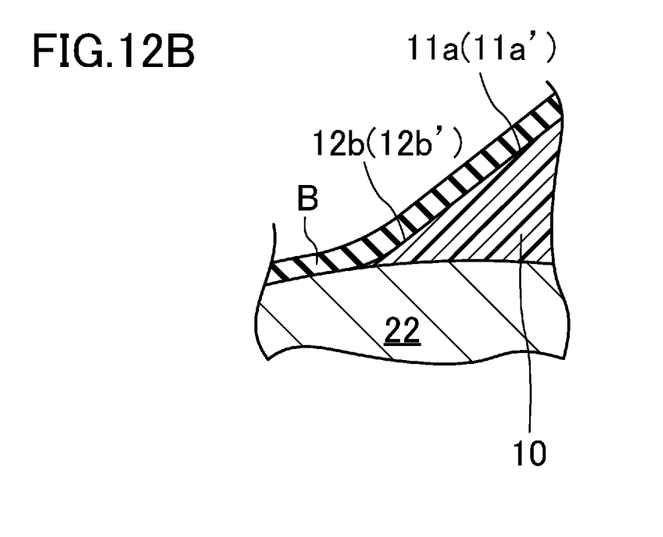
FIG. 12B is a diagram illustrating how the V-ribbed belt climbs up the front surface of the detacher in the absence of a step between the circumferential surface of the pulley and the front surface of the detacher.

Moreover, as illustrated in FIG. 12A, a step between the circumferential surface of the second ribbed pulley 22 and the front surface 11a serving as the belt-climbing surface 11a' might cause reversed bending where the V-ribbed belt B is bent at the step when the V-ribbed belt B climbs up the front surface 11a. However, as illustrated in FIG. 12B, the surface 12b, serving as the belt-introducing surface 12b', on the front surface side of the pulley engagement portion 12 is tilted and forms a smooth, continuous surface with the circumferential surface of the second ribbed pulley 22 and the front surface 11a. Thus, the surface 12b enables the V-ribbed belt B to smoothly climb up the front surface 11a from the circumferential surface of the second ribbed pulley 22, and can avoid reversed bending of the V-ribbed belt B.

Furthermore, the undersurface 11g, of the detacher 11, serving as the flange cover 11g' covering the flange 22a of the second ribbed pulley 22 is provided on the widthwise side, of the pulley 22, from which the belt B is detached. Thus, this configuration can reduce damage, to the V-ribbed belt B, that occurs due to contact with the flange 22a of the second ribbed pulley 22 when the V-ribbed belt B is detached from the second ribbed pulley 22.

In this embodiment, the belt detachment tool 10 is used to detach the V-ribbed belt B wound over the ribbed pulley 20. An object to be detached is not limited to the V-ribbed belt B. Alternatively, the belt detachment tool 10 may detach another type of power transmission belt such as a V-belt etc. wound over the pulley.

In this embodiment, the belt detachment tool 10 is an injection-molded article. The belt detachment tool 10 is not limited to an injection-molded article. The belt detachment tool 10 may be a resin-cutting article, or may be made of another material such as a metal.

EXAMPLES

Nine belt detachment tools, of Examples 1-5 and Comparison Examples 1-4, having the same configuration as that of the above-described embodiment were tested and evaluated.

(Belt Detachment Tools)

The belt detachment tools, of Examples 1-5 and Comparison Examples 1-4, having the same configuration as that of the above-described embodiment were prepared for the test and evaluation. The belt detachment tools of Examples 1-5 included round surfaces serving as belt-transferring surfaces. The round surfaces of belt detachment tools of Examples 1-5 had belt contact portions having, in plan view, radiuses of curvature of 5 mm, 6 mm, 8 mm, 10 mm, and 11 mm, respectively. The belt detachment tools of Comparison Examples 1-4 included round surfaces serving as belt-transferring surfaces. The round surfaces of the belt detachment tools of Comparison Examples 1-4 had belt contact portions having, in plan view, radiuses of curvature of 2 mm, 4 mm, 12 mm, and 15 mm, respectively.

(Test and Evaluation Method)

A brand-new V-ribbed belt, for automobiles, attached on a belt transmission apparatus that drives auxiliary machinery of an automobile was detached from the belt transmission apparatus by each of the belt detachment tools of Examples 1-5 and Comparison Examples 1-4. Then, the detached V-ribbed belt was attached again on the belt transmission apparatus. This operation was repeated ten times for each V-ribbed belt.

After the V-ribbed belt was attached and detached ten times, the surfaces of the ribs on the V-ribbed belt were observed.

Note that a ribbed pulley used for the test and evaluation had a diameter of 120 mm. The V-ribbed belt had a length of 678 mm, a width of 10.68 mm, and a thickness of 4.3 mm. The heights of the ribs were 2.0 mm. The distance between bases of the ribs was 3.56 mm. The number of the ribs was three.

(Test Evaluations)
Table 1 shows the test evaluations.

TABLE 1

| | Radius r of Curvature of Belt-Transferring Surface (mm) | Cracking on Side of Rib | Fraying on Edge of Rib | Evaluation |
| --- | --- | --- | --- | --- |
| Example 1 | 5 | Not Cracked | Not Frayed | OK |
| Example 2 | 6 | Not Cracked | Not Frayed | OK |
| Example 3 | 8 | Not Cracked | Not Frayed | OK |
| Example 4 | 10 | Not Cracked | Not Frayed | OK |
| Example 5 | 11 | Not Cracked | Not Frayed | OK |
| Comparison Example 1 | 2 | Not Cracked | Significantly Frayed | NG |
| Comparison Example 2 | 4 | Not Cracked | Frayed | NG |
| Comparison Example 3 | 12 | Cracked | Not Frayed | NG |
| Comparison Example 4 | 15 | Cracked | Not Frayed | NG |

The belt detachment tools of Examples 1-5 and Comparison Examples 1 and 2 did not show cracks on side surfaces of their ribs. In contrast, the belt detachment tools of Comparison Examples 3 and 4 showed cracks on side surfaces of their ribs.

Edges of the ribs on the belt detachment tools of Examples 1-5 and Comparison Examples 3 and 4 were not frayed. In contrast, edges of the ribs on the belt detachment tools of Comparison Examples 1 and 2 were frayed. In particular, the edges of the ribs on the belt detachment tool of Comparison Example 1 were significantly frayed.

From the above evaluation, in conclusion, the belt detachment tools of Examples 1-5 were OK. In contrast, the belt detachment tools of Comparison Examples 1-4 were NG.

The belt detachment tool of the present invention is useful for detaching a power transmission belt wound over a pulley, and particularly, for detaching a V-ribbed belt wound over a pulley of a belt transmission apparatus for driving auxiliary machinery in an engine room of an automobile.

Having described a specific embodiment of our bearing, it is believed obvious that modification and variation of our invention is possible in light of the above teachings.

What is claimed is:
1. A belt detachment tool used to detach, with a pulley rotated, a power transmission belt wound over the pulley, the belt detachment tool comprising:
   a detacher; and
   a pulley engagement portion engaging with the pulley so that the detacher protrudes outwardly from a circumferential surface of the pulley, wherein
   the detacher with the pulley engagement portion engaging with the pulley includes a belt-climbing surface, a belt-sliding surface, and a belt-transferring surface,
   the belt-climbing surface is a front surface having an upward slope from a front side to a rear side with respect to a rotation direction of the pulley from which the belt is detached,
   the belt-climbing surface that is in contact with an inner circumferential surface of the power transmission belt wound over the pulley guides the power transmission belt climbing up from a side, of the belt-climbing surface, closer to the pulley to a side, of the belt-climbing surface, farther from the pulley when the detacher is wedged between the pulley and the power transmission belt after the pulley is rotated and the detacher is posi- tioned at a beginning from which the power transmission belt is wound over the pulley, the belt-sliding surface is a side surface having an upward slope from a widthwise side, of the pulley, from which the belt is detached, to a side opposite thereto, the belt-sliding surface that is in contact with the inner circumferential surface of the power transmission belt climbing up the belt-climbing surface guides the power transmission belt out of the pulley sliding down from a side, of the belt-sliding surface, farther from the pulley to a side, of the belt-sliding surface, closer to the pulley, the belt-transferring surface is an outwardly curved round surface provided between the belt-climbing surface and the belt-sliding surface, and connecting the belt-climbing surface with the belt-sliding surface smoothly, the belt-transferring surface that is in contact with the inner circumferential surface of the power transmission belt climbing up the belt-climbing surface transfers the power transmission belt to the belt-sliding surface, and at least a belt contact portion of the belt-transferring surface has a radius of curvature of 5-11 mm in plan view, the belt detachment tool further comprising a guide which is provided on the side opposite to the widthwise side of the pulley from which the belt is detached, the pulley engagement portion includes a plurality of parallel ribs engaging with grooves of a ribbed pulley, and a flange of the ribbed pulley fits into a space between the guide and the rib, closest to the side opposite to the side from which the belt is detached, of the plurality of ribs constituting the pulley engagement portion.

2. The belt detachment tool of claim 1, wherein a surface on a front surface side of the pulley engagement portion engaging with the pulley is a tilted belt-introducing surface forming a smooth, continuous surface with the circumferential surface of the pulley and the belt-climbing surface.

3. The belt detachment tool of claim 1, further comprising:

a flange cover provided on the widthwise side, of the pulley, from which the belt is detached, and covering a flange of the pulley.

4. The belt detachment tool of claim 1, wherein the belt detachment tool is used to detach a V-ribbed belt wound over a ribbed pulley of a belt transmission apparatus for driving auxiliary machinery in an engine room of an automobile.

5. The belt detachment tool of claim 1, wherein at least a belt contact portion of the belt-transferring surface has, in plan view, a radius of curvature that is 1.2-2.6 times as large as a thickness of a power transmission belt to be detached.

6. The belt detachment tool of claim 1, wherein the belt-climbing surface is a smooth tilted surface.

7. The belt detachment tool of claim 6, wherein the belt-climbing surface has a tilt angle of 20-60°.

8. The belt detachment tool of claim 1, wherein the belt-sliding surface is a smooth tilted surface.

9. The belt detachment tool of claim 8, wherein the belt-sliding surface has a tilt angle of 30-70°.

10. The belt detachment tool of claim 1, wherein the belt detachment tool is an injection-molded article made of a resin material.

11. The belt detachment tool of claim 1, wherein the guide protrudes further than each of the plurality of ribs in a direction towards a center of the pulley.

* * * * *